No. 663,176. Patented Dec. 4, 1900.
T. E. KIRK.
LAND CLEARING IMPLEMENT.
(Application filed Mar. 26, 1900.)
(No Model.)
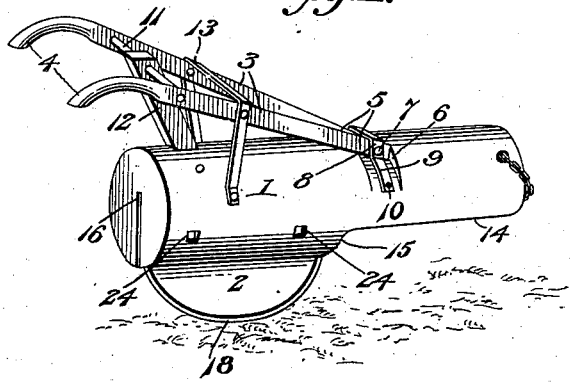
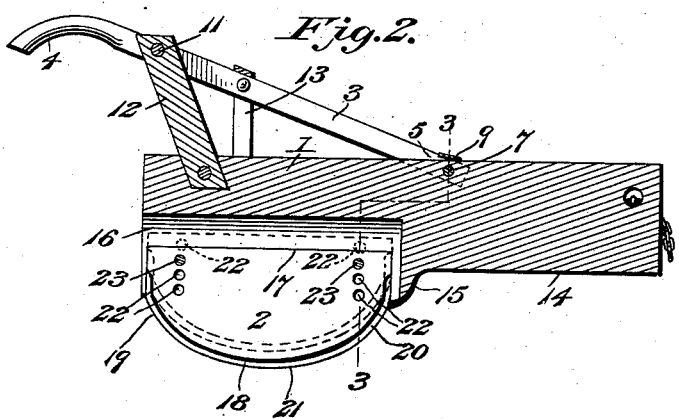
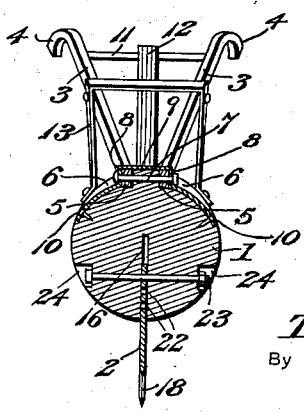
Witnesses
Edwin G. McKee
Louis T. Julihn
Thomas E. Kirk
By
E. G. Siggers
Attorney

UNITED STATES PATENT OFFICE.

THOMAS E. KIRK, OF DEEP CREEK, VIRGINIA.

LAND-CLEARING IMPLEMENT.

SPECIFICATION forming part of Letters Patent No. 663,176, dated December 4, 1900.

Application filed March 26, 1900. Serial No. 10,283. (No model.)

*To all whom it may concern:*

Be it known that I, THOMAS E. KIRK, a citizen of the United States, residing at Deep Creek, in the county of Norfolk and State of Virginia, have invented a new and useful Land-Clearing Implement, of which the following is a specification.

My invention relates to a novel land-clearing implement which, for want of a more apt designation, may be termed a "furrow-opener."

Before proceeding with a description of the structural embodiment of the invention it may be well to refer briefly to those conditions which have led to origination of the device to be described. The clearing of new ground or of what is known in bucolic parlance as "old lay-out ground" has heretofore been necessarily laborious and expensive, for the reason that such ground abounds with roots ranging in size from such as present no resistance to the plow to substantial obstructions of several inches in diameter. Ordinarily many of these roots have to be grubbed out individually, which is expensive and laborious, but absolutely necessary, for the reason that they constitute such substantial impediments as to make the effective use of a plow impossible. Various expedients have been devised for the purpose of removing these roots, underbrush, and hedge growths; but so far as I am aware such expedients have been only partially successful, for the reason that they are either attached to the plow in the form of a colter or are used independently with their cutting edges so disposed across the line of draft as to cause the cutter to jam when opposed by a root too stout to be entirely severed. Obviously the result of this jamming is a very injurious jarring of the team, as they are stopped suddenly by the hanging of the implement, which must then be drawn back and pulled out from the ground before the team can continue.

By my invention I seek to accomplish the clearing and opening of the ground with the least possible strain on the team and without encountering the frequent necessity of dislodging the cutter from such roots or other obstructions as it is unable to sever.

To the accomplishment of this end the invention provides a cutter having an extended horizontally-curved cutting edge urged into effective relation to the ground and to vegetation to be opened up by a heavy stock or body part, which combines with the draft to force the cutter through the ground and roots.

The invention further consists in making the cutter vertically adjustable to regulate the depth of cut according to the nature of the ground and in making it reversible in order that its life may be prolonged by the alternate use of its opposite edges.

Further peculiarities of construction and arrangement will appear more fully hereinafter, and the device in its entirety will be fully illustrated in the accompanying drawings and comprehended within the scope of the appended claims.

Referring to said drawings, Figure 1 is a perspective view of my furrow-opener. Fig. 2 is a central longitudinal sectional view of the subject-matter of Fig. 1, showing an adjusted position of the cutter in dotted lines. Fig. 3 is a transverse sectional view on the line 3 3 of Fig. 2.

Referring to the numerals of reference, indicating corresponding parts in the several views, 1 indicates a heavy stock of sufficient weight and dimensions to force the cutter 2 through substantial roots or other obstructions. The stock 1 is provided in any suitable manner with handles 3, by means of which its movement is guided. These handles are preferably formed at the rear ends of divergent handle-bars 4, having their lower or forward ends 5 seated in recesses 6 in the stock and connected by a bolt 7, piercing angular portions 8 of a handle-securing strap 9, the ends of which latter are bent into conformity with the contour of the stock and are secured thereto by screws or other fastening devices 10. The bolt 8 likewise passes through the ends of the handle-bars 4 and through that portion of the stock lying intermediate of the recesses 5. The upper rear ends of the handle-bars are sustained and connected in any desired manner, but preferably by a cross-bar 11, passing at its middle through an inclined handle-post 12, extending upwardly from the stock intermediate of the handle-bars, which latter may be further braced and stayed by a second metal strap 13, bolted to the bars 4 and connected at its ends to the stock. The arrangement shown for attaching the handle is preferable, perhaps, but may be substituted by any well-known expedient. The stock 1, which in practice is a heavy preferably substantial cylindrical section of oak or other ponderous timber, is cut away at the forward end of its under side to form a flat runner-face 14, intersecting at its rear extremity with a substantially vertical, but somewhat inclined, guide or buffer face 15, constituting the front wall of the comparatively heavy cutter-retaining portion of the stock. The rear end of the stock 1—that is to say, that portion intermediate of the face 15 and its rear end—is provided in its under face with a deep comparatively narrow cutter kerf or socket 16, within which the cutter 2 is adjustably retained, the width of the kerf being just sufficient to accommodate the cutter without permitting lateral movement or vibration of the latter, which would serve to effect the ultimate derangement of parts.

Various forms of cutters may be employed in connection with the stock described; but that form which I have found entirely effective and for many reasons most desirable comprehends a flat chilled-steel plate having a straight upper edge 17 and a long sweepingly-curved cutting edge 18, extending from end to end of the edge 17. The cutting-edge 18 may, if desired, be arcuate; but I prefer to form it in the shape of a horizontal side section of an ellipse—that is to say, I prefer to have its end portions 19 and 20 of comparatively slight radius and connected by an intermediate curved portion 21 of considerably greater radius. The utility of this particular construction resides in the fact that the forward end portion of the cutting edge is comparatively abruptly curved in order to present an effective edge substantially across the line of draft to facilitate cutting through ordinary ground, roots, or stubble, but sufficiently inclined to present a yielding resistance to the draft-animals in the event of the obstruction being too heavy to be severed by the direct longitudinal pull upon the stock. In the latter event the cutter will ride up and the long comparatively slightly curved intermediate cutting edge 21 will be presented to the obstruction and will now be urged forwardly by the draft exerted upon the stock and downwardly by the considerable weight of the rear end of said stock. The rear end of the long cutting edge 21 is finally reached and the more abruptly curved rear end face 19 immediately becomes effective under the superimposed weight of the stock, the cut in this instance being practically rearward, provided the weight of the stock is sufficient to produce the cut independently of the draft. It should be noted, further, that the coaction of the longitudinal draft exerted by the draft-animals and the pressure exerted upon the cutter by the ponderous weight of the stock will produce a clear shear cut.

I have found that an implement constructed as described will effectively open up new ground or old lay-out ground by easily cutting through any vegetation ordinarily encountered; but it will be observed that the formation of both the stock and cutter is such that if a root too substantial to be severed should be encountered or if the cutter should strike a rock or other similar obstruction the implement would simply ride thereover without jamming or producing a jar injurious to man or beast.

The device constructed as thus far described constitutes a complete embodiment of my invention, inasmuch as it would be entirely effective in many instances. In order, however, to accommodate various contingencies of use and to prolong the life of the cutter, I provide means for mounting the latter reversibly in the stock and for effecting its vertical adjustment therein, as desired. To effect these ends, I provide the cutter with vertical series of bolt-openings 22 adjacent to its opposite ends and designed for the reception of cutter-retaining bolts 23, passed through the stock adjacent to its rear end and to the buffer-face 15 and immediately below the bottom of the kerf. These bolts are provided with heads and nuts at their opposite ends, as usual, and, if desired, said heads and nuts may be accommodated by recesses 24 in the stock in order that they may be protected from the dirt, which might otherwise work between the coöperating threads on the bolts and nuts and hinder the removal of the latter for the purpose of effecting the adjustment of the cutter.

It may be noted in conclusion that a cutter constructed in accordance with my invention is to a considerable degree self-sharpening, inasmuch as the abrasion of the opposite side faces of the rear cutting edge by the earth and hard substances therein—such, for example, as sand, stones, and the like—serves to grind down the cutting edge and in a measure resharpen such edge in order that it may replace the front cutting edge by the reversal of the cutter. It may be further noted that the adjustability of the cutter, while permitting the depth of cut to be regulated, may also be employed for the purpose of lowering the cutter to compensate for wear. Any suitable means for attaching the draft devices may be employed—as, for instance, the ordinary clevis; but I prefer to provide a transverse opening through the stock at its forward end through which the draft-chain may be passed, as shown.

From the foregoing it will be observed that I have produced a simple, ingenious, and highly-effective land-clearing implement which may be used for opening up furrows in either new ground or in old lay-out ground, as the case may be; but while the present embodiment of my invention appears at this time to be preferable I do not desire to limit myself to the structural details defined, but reserve the right to effect such changes, modifications, and variations as may come properly within the scope of the protection prayed.

What I claim is—

1. An implement of the character described comprising a heavy stock and a reversible cutter secured to the under side of the stock and having its front and rear ends formed with cutting edges.

2. An implement of the character described comprising a heavy stock having a longitudinal kerf in its under side, and a cutter seated in the kerf and having its front and rear ends formed with cutting edges below the stock.

3. An implement of the character described comprising a heavy stock having a longitudinal kerf in its under side, a reversible cutter seated in the kerf, and means for effecting the adjustment of the cutter.

4. An implement of the character described comprising a heavy stock, and a cutter having the opposite ends of its cutting edge identically curved and its intermediate portion curved in less degree than its end portions.

5. An implement of the character described, comprising a heavy stock cut away at the forward end of its under side to form runner and buffer faces angularly disposed; and a cutter depending from the stock in the rear of the buffer-face and having its entire exposed cutting-face curved.

In testimony that I claim the foregoing as my own I have hereto affixed my signature in the presence of two witnesses.

THOS. E. KIRK.

Witnesses:
JOHN H. SIGGERS,
EDWIN E. VROOMAN.